(12) United States Patent
Cook

(10) Patent No.: US 7,933,067 B1
(45) Date of Patent: Apr. 26, 2011

(54) FLAT FIELD SCHMIDT TELESCOPE WITH EXTENDED FIELD OF VIEW

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/720,373

(22) Filed: Mar. 9, 2010

(51) Int. Cl.
*G02B 23/00* (2006.01)
(52) U.S. Cl. ............... 359/399; 359/364
(58) Field of Classification Search .......... 359/364, 359/399
See application file for complete search history.

(56) References Cited

U.S. PATENT DOCUMENTS

| | | | |
|---|---|---|---|
| 2,563,433 A * | 8/1951 | Taylor | 359/731 |
| 3,022,708 A * | 2/1962 | Baker | 359/728 |
| 3,748,015 A | 7/1973 | Offner | |
| 4,240,707 A | 12/1980 | Wetherell et al. | |
| 4,576,452 A * | 3/1986 | Abel et al. | 359/858 |
| 4,598,981 A | 7/1986 | Hallam et al. | |
| 4,650,275 A * | 3/1987 | Jones | 359/350 |
| 4,881,801 A | 11/1989 | Gebelein | |
| 5,161,051 A * | 11/1992 | Whitney et al. | 359/351 |
| 5,331,470 A | 7/1994 | Cook | |
| 5,796,515 A * | 8/1998 | Katsunuma | 359/364 |
| 5,880,834 A | 3/1999 | Chrisp | |
| 6,100,974 A | 8/2000 | Reininger | |
| 7,390,101 B2 * | 6/2008 | Lundgren | 359/858 |
| 7,554,728 B1 * | 6/2009 | Ackermann | 359/399 |

FOREIGN PATENT DOCUMENTS

JP 60006915 A * 1/1985

OTHER PUBLICATIONS

Brixner, Berlyn, "A 3048-mm, f/2.5, Flat-Field Schmidt Telescope Design," Applied Optics, vol. 6, No. 5, pp. 1069-1072 (Jun. 1967).
Linfoot, E. H., "Recent Advances in Optics," Oxford Univ. Press, London, pp. 208-228 (1955).
Marx, S. & Pfau, W., "Astrophotography with the Schmidt Telescope," English translation by Lamble, P., Cambridge Univ. Press (1992).
Schmidt, Von Bernhard, "Ein lichtstarkes komafreies Spiegelsystem," Central-Zeitung für Optik und Mechanik 52. Jahrgang, pp. 25-26 (1931).

* cited by examiner

*Primary Examiner* — Mark Consilvio
(74) *Attorney, Agent, or Firm* — Pillsbury Winthrop Shaw Pittman LLP

(57) ABSTRACT

Various embodiments provide a flat field Schmidt-type telescope including a spherical primary mirror, an aspheric correcting plate spaced apart from the primary mirror, a detector disposed between the primary mirror and the corrector plate, and a field lens disposed between the primary mirror and the detector. The field lens is configured to reshape a curved field plane formed by the primary mirror into a flat field plane. A material of the field lens is selected to transmit in the infrared wavelength range (e.g., SWIR and/or MWIR) and is selected to have a desired refractive index so as to achieve a field of view (FOV) of the telescope greater than approximately 10 degrees.

16 Claims, 4 Drawing Sheets

FLAT FIELD SCHMIDT TELESCOPE WITH EXTENDED FIELD OF VIEW

BACKGROUND

This disclosure pertains to a Schmidt telescope and in particular to a flat field Schmidt telescope having an extended field of view.

A classical Schmidt telescope, also referred to as Schmidt camera, is a catadioptric astronomical telescope or camera designed to provide relatively wide field of view while reducing aberrations in comparison with other telescopes. It is named for its inventor Bernhard Schmidt, who wrote of its properties in 1931 in "Ein lichtstarkes komafreies Spiegelsystem," *Central-Zeitung für Optik and Mechanik* 52.2 (1931), pp. 25-26. A detailed description of a flat field Schmidt telescope can be found in "Recent Advances in Optics," by E. H. Linfoot, Oxford University Press, 1955. FIG. 1 shows a flat field Schmidt telescope 10. Flat field Schmidt telescope 10 includes spherical primary mirror 12 and aspherical correcting plate (known as a corrector plate) 14 spaced apart from primary mirror 12. Aspherical correcting plate 14 is generally not located at a center of curvature of primary mirror 12 for flat field Schmidt telescopes, unlike classical Schmidt telescopes, but in both cases, the corrector plate generally defines the entrance pupil 15 of telescope 10. A film or other detector 16 is placed inside telescope 10 between primary mirror 12 and corrector plate 14, at a focal point of primary mirror 12. Flat field Schmidt telescope design 10 is noted as having fast focal ratios (i.e., small focal ratios or small F-numbers) while limiting coma and astigmatism.

A classical Schmidt telescope has a curved focal plane or curved field plane. As a result, a classical Schmidt telescope generally requires a curved detector to match the curvature of the focal plane. In order to be able to use a flat detector instead of a curved detector, field flattener or field flattening optics 18 can be placed in front of detector 16 between primary mirror 12 and detector 16 so as to obtain a flat field plane on detector 16. Flat field Schmidt telescopes such as Schmidt telescope 10 are typically used as a survey instrument in which a large area of the sky is covered.

A classical Schmidt telescope configuration can be modified by combining with a Cassegrain telescope configuration to produce the Schmidt-Cassegrain telescope. In the Schmidt-Cassegrain telescope, a Cassegrain reflector's optical path is combined with a Schmidt corrector plate (i.e., aspherical correcting plate) to make a compact telescope. The Schmidt-Cassegrain telescope uses a spherical primary mirror, a Schmidt corrector plate and a Cassegrain secondary mirror which can act as field flattener and directs the image through an opening in the primary mirror to a final focal plane located behind the primary mirror. In addition to the Schmidt-Cassegrain telescope, other combinations or modifications of the Schmidt telescope are also possible such as the Baker-Schmidt telescope, the Mersenne-Schmidt telescope, the Schmidt-Newtonian telescope, and the Schmidt-Väisälä telescope, etc.

Although the flat field Schmidt telescope 10 provides relatively wide field of view (FOV) compared to other types of telescopes, the field of view (FOV) of conventional flat field Schmidt telescope 10 is generally limited to approximately 8 to 9 deg. (e.g., about 8.6 deg.). In addition, the flat field Schmidt telescope 10 is mostly used in the visible range of wavelengths. The corrector plate or correcting lens 14 and the field flattening optics 18 are made from optical glass or fused silica which have a refractive index between about 1.5 and about 1.6 and/or Calcium Fluoride ($CaF_2$) which has a refractive index of about 1.4. These materials transmit light in the visible range of wavelengths.

Therefore, there is a need in the art for a flat field Schmidt telescope that is configured to be used in the infrared range of wavelengths including the short wavelength infrared (SWIR) range (between about 1.4 μm and about 3 μm) and the mid wavelength infrared (MWIR) range (between about 3 μm and about 8 μm) while providing an extended field of view (FOV).

SUMMARY

One or more embodiments of the present disclosure provide a flat field Schmidt-type telescope including a primary mirror, a correcting plate spaced apart from the primary mirror, a detector disposed between the primary mirror and the corrector plate, and a field lens disposed between the primary mirror and the detector. The field lens is configured to reshape a curved field plane formed by the primary mirror into a flat field plane. A material of the field lens is selected to transmit in the infrared wavelength range and is selected to have a desired refractive index so as to achieve a field of view (FOV) of the telescope greater than approximately 10 degrees.

Another embodiment of the present disclosure provides a method of extending a field of view of a flat field Schmidt-type telescope. The method includes selecting a plurality of materials that transmit in the infrared wavelength range, computing a desired refractive index of a material of a field lens of the telescope so as to achieve an extended field of view of the telescope greater than approximately 10 degrees, and selecting one or more materials in the plurality of materials that have the desired refractive index for making the field lens of the telescope.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
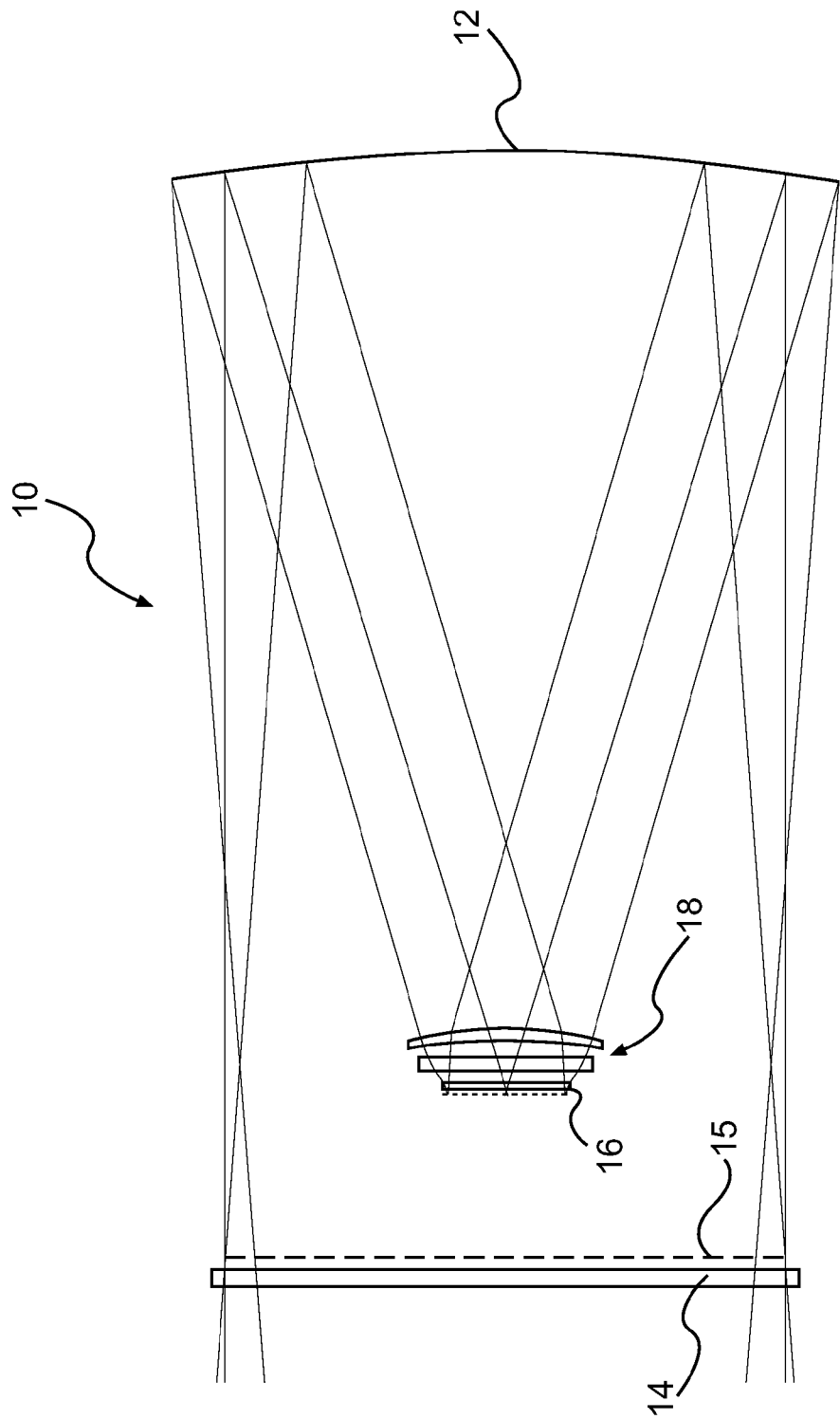
FIG. 1 shows an example of a conventional flat field Schmidt telescope.
Figure 2A:
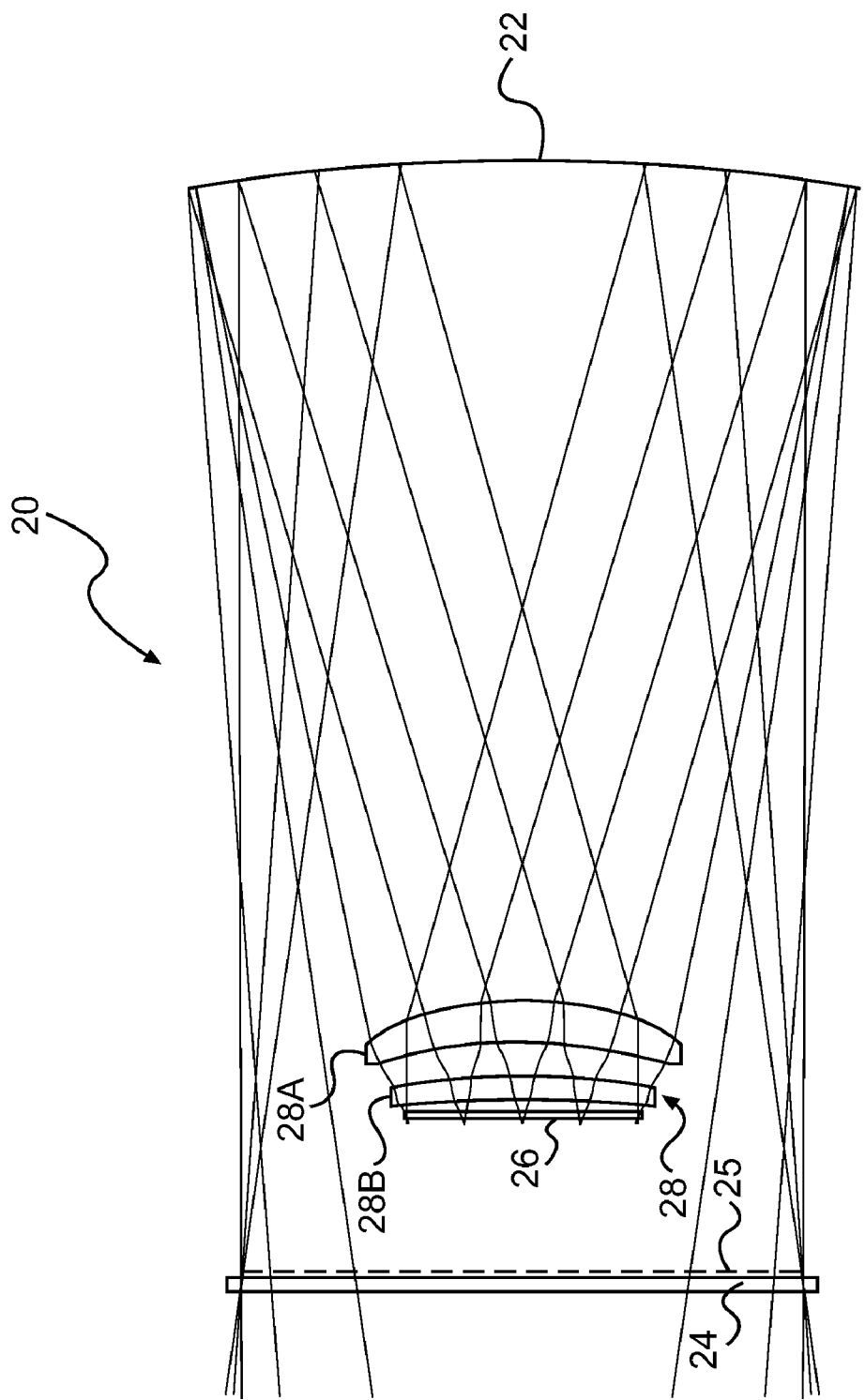
FIG. 2A shows a flat field Schmidt telescope according to an embodiment.

FIG. 2A shows a flat field Schmidt telescope according to an embodiment. Schmidt telescope 20 includes spherical primary mirror 22 and aspherical correcting plate (or corrector plate) 24. Aspherical correcting plate 24 is generally not located at a center of curvature of the primary mirror 22 and defines the entrance pupil 25 of telescope 20. Detector 26 is placed inside telescope 20 between primary mirror 22 and corrector plate 24. In one embodiment, detector 26 (e.g., a Focal Plane Array (FPA)) is a charge coupled device (CCD) type detector. In another embodiment, detector 26 is an appropriate IR wavelength sensing focal plane array composed of HgCdTe or InSb material. Schmidt telescope 20 also includes field flattener or field flattening optics (also referred to herein as field lens) 28. Field lens 28 is positioned between primary mirror 22 and detector 26. Although the term field lens is used, it must be appreciated that field lens 28 is not limited to only one lens but can comprise one, two or more lenses or optical elements. In one embodiment, field flattening optics or field lens 28 comprises two lenses 28A and 28B. Field flattening optics or field lens 28 is placed in front of the detector 26 so as to reshape the curved focal or field plane formed by primary mirror 22 to obtain a flat field plane on detector 26.

Figure 2B:
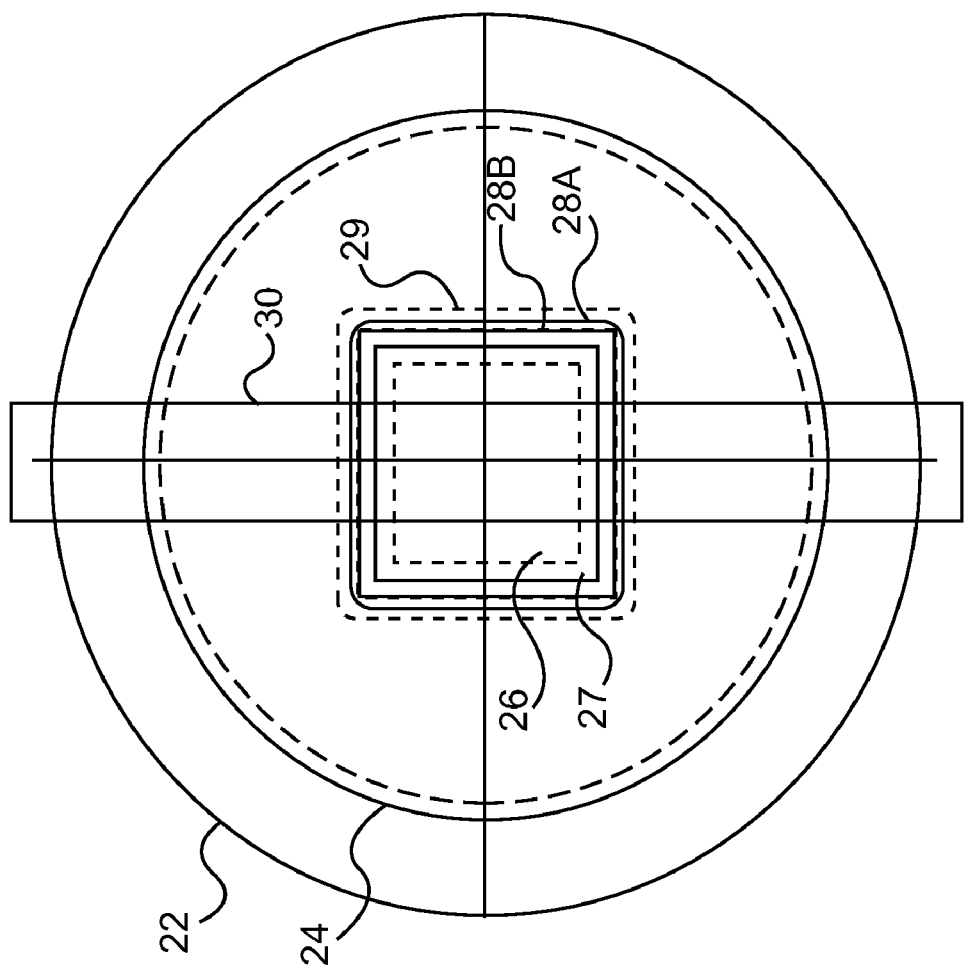
FIG. 2B is a frontal view of the telescope showing the position of various components of the telescope depicted in FIG. 2A.

FIG. 2B is a frontal view of telescope 20 showing the position of various components of telescope 20, according to one embodiment. A perimeter of primary mirror 22 is depicted as a solid outer circle. A perimeter of corrector plate 24 is depicted as a solid inner circle. The dotted circle corresponds to the entrance pupil 25. In this embodiment, detector 26 is shown having a square shape. However, as it can be appreciated detector 26 can have other shapes including a rectangular shape, a circular shape, etc. A perimeter of detector 26 is depicted by a dotted line. In one embodiment, telescope 20 may further include spectral filter 27 for selecting a band or a range of wavelengths that are desired. In one embodiment, spectral filter 27 is positioned in front of detector 26 between field lens 28 and detector 26. A perimeter of spectral filter 27 is depicted by a solid square. Perimeters of lenses 28A and 28B are depicted by respectively two solid squares. The most exterior dashed square depicts the perimeter of holder 29 for holding lenses 28A and 28B. The elongated vertical rectangle represents support 30 through which connections to mechanical, thermal and electrical systems are guided through to detector 26.

The material of field lens 28 in telescope 20 is selected so as to extend the FOV of telescope 20. In one embodiment, the material of the field lens 28 is selected so as to achieve a FOV of greater than about 10 degrees (for example, greater than about 15 degrees). Specifically, the material of field lens 28 is selected from optical materials that transmit in the infrared region of the spectrum (e.g., SWIR and MWIR wavelength ranges), as well from optical materials having a desired refractive index to achieve an extended FOV of telescope 20.

In order to determine an appropriate refractive index or an appropriate range of refractive indices that can provide an extended FOV of telescope 20 (e.g., a FOV greater than about 10 degrees), calculations and ray tracing simulations are implemented. Equations (1) and (2) below define the interrelationship between field lens location (e.g., distance between field lens and primary mirror), field lens focal length, and field lens refractive index.

Equation (1) provides the relationship between the focal length $f_{ml}$ of the system mirror-lens (i.e., focal length of the primary mirror 22 in combination with the field lens 28), focal length $f_l$ of field lens 28, focal length $f_m$ (which is equal half of radius $R_m$) of primary mirror 22 and distance d separating primary mirror 22 and field lens 28.

Equation (2) is the zero Petzval condition, where $R_p$ is the Petzval surface radius. The zero Petzval condition provides the relationship between the refractive indices $n_i$ of the optical elements in the telescope 20 and the focal lengths $f_i$ of the optical elements in the telescope 20.

$$f_{ml} = \frac{f_m * f_l}{f_m + f_l + d} \quad (1)$$

$$\frac{1}{R_p} = \sum_i \frac{1}{n_i * f_i} = 0 \quad (2)$$

Using equation (1), the focal length $f_l$ of the field lens 28 can be expressed as a function of distance d in equation (3) assuming that the focal length $f_{ml}$ and the focal length $f_m$ are fixed.

$$f_l = \frac{d - f_m}{1 - \frac{f_m}{f_{ml}}} \quad (3)$$

Using equation (2), the relationship between the refractive index $n_l$ of field lens 28 and the focal length $f_l$ of field lens 28 and the focal length $f_m$ of primary mirror 22 can be expressed by the following equation (4).

$$f_m + n_l * f_l = 0 \quad (4)$$

By combining equations (3) and (4), the refractive index of the material of the field lens is determined by the following relationship (5).

$$n_l = \frac{(f_m - f_{ml})f_m}{(d - f_m)f_{ml}} \quad (5)$$

By selecting the focal length $f_m$ of primary mirror 22 and the focal length $f_{ml}$ of the system (primary mirror 22 and field lens 28) as a whole as fixed or constants, the focal length $f_l$ of the system can be determined as a function of distance d. For example, in one embodiment, the aperture is selected be equal to approximately 11 inches (approximately 28 cm), the focal length $f_m$ of primary mirror 22 is selected to be equal to approximately 18.5 inches (approximately 47 cm), and the focal length $f_{ml}$ of the system mirror-lens (i.e., focal length of primary mirror 22 in combination with field lens 28) is selected to be approximately equal to 15.4 inches (approximately 39 cm). In this configuration, primary mirror 22 provides an F-number of about F/1.69 and the system mirror-lens (primary mirror 22 in combination with field lens 28) provides an F-number of about F/1.40. In this example, corrector plate 24 is positioned at a distance of approximately 22 inches (approximately 56 cm) from primary mirror 22.

Figure 3:
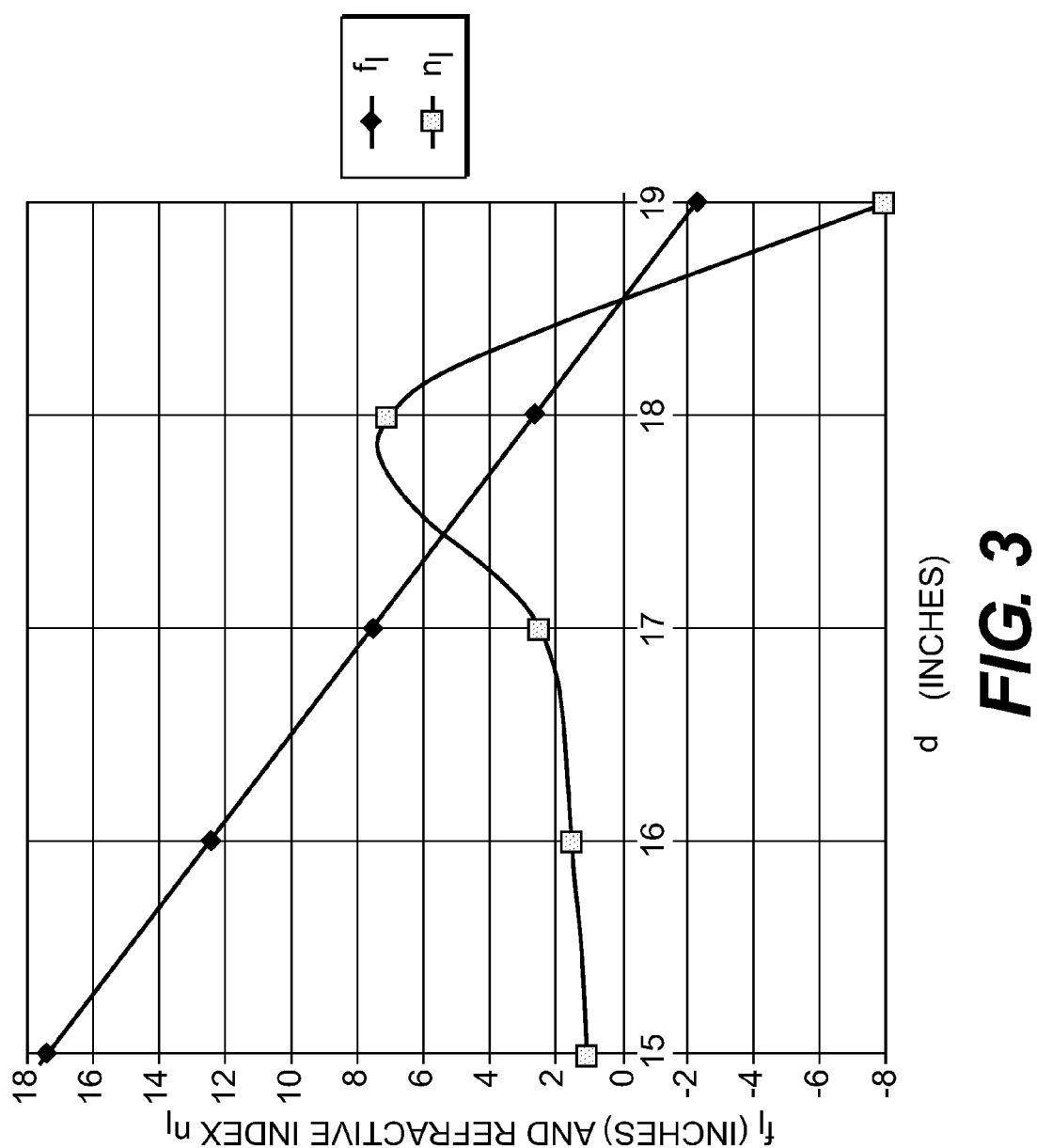
FIG. 3 is a graph showing a plot of a focal length of field lens in telescope depicted in FIG. 2A as a function of distance d between the primary mirror and field lens of the telescope, and a plot of the refractive index of the field lens 28 as a function of the distance d.

FIG. 3 is a graph showing the plot of the focal length $f_l$ of field lens 28 as a function of distance d between primary mirror 22 and field lens 28, i.e., a plot of equation (3), and the plot of the refractive index $n_l$ of the field lens 28 as a function of the distance d, i.e., a plot of equation (5). As shown in FIG. 3, the plot of focal length $f_l$ of field lens 28 as a function of distance d is linear as reflected in equation (3). On the other hand, the plot of the refractive index $n_l$ as a function of distance d is a curve having a maximum around at a distance d of about 17.9 inches (approximately 45.5 cm).

By selecting materials of the field lens 28 that provide transmission in a wavelength range of interest (e.g., between about 2.5 μm and about 5 μm), a corresponding range of refractive indices for these material can be obtained (e.g., between about 1.4 and about 4). Based on the range of possible refractive indices of the materials of the field lens 28 (e.g., between about 1.4 and about 4), a corresponding range of distances d between primary mirror 22 and field lens 28 can be determined using the plot of equation (5) in FIG. 3. In this case, based on the range between about 1.4 and about 4 of possible refractive indices, the range of possible distances d is determined to be between about 16 inches and about 17.3 inches.

Within the confine of this solution space, empirical ray-tracing can be used to identify optimum values of location (distance d), focal length $f_l$, and refractive index $n_l$ that most successfully correct off-axis coma and astigmatism and provide an enhanced FOV. Using ray-tracing simulation models, a solution is identified that satisfies the desired properties of maximum FOV, i.e., a FOV greater than approximately 10 degrees (e.g., a FOV greater than approximately 15 degrees), while coma and astigmatism (i.e., optical aberrations) are reduced or minimized. The solution provides for a material of the field lens 28 having a refractive index of approximately 2.0, a focal length of field lens 28 of approximately 9.1 inches (approximately 23 cm) and a distance d between primary mirror 22 and filed lens 28 of approximately 16.7 inches (approximately 42.5 cm).

For the above solution, a ratio of an effective focal length of primary mirror 22 on an effective focal length $f_{sys}$ of the whole system 20 is about 1.2 (i.e., $f_m/f_{sys}=1.21$). For the above solution, a ratio of a product of the refractive index $n_l$ and an effective focal length $f_l$ of field lens 28 on an effective focal length of the whole system 20 is about 1.2 (i.e., $n_l*f_l/f_{sys}=1.21$). For the above solution, a ratio of two multiplied by an effective focal length $f_l$ of field lens 28 is equal to an effective focal length fm of primary mirror 22 (i.e., $2*f_l=f_m$). For the above solution, the optimum of a ratio of length 1 between primary mirror 22 and corrector 24 on an effective focal length $f_{sys}$ of the whole system 20 is equal to approximately 1.45 (i.e, $l/f_{sys}=1.45$).

Table 1 provides the refractive indices and the effective Abbe number of various materials that transmit in the wavelength range of interest, between about 2.5 μm and about 5 μm (e.g., around about 3.75 μm). The relative Abbe number is a measure of optical dispersion (variation of refractive index with wavelength) of a material in relation to the refractive index. A material having a low optical dispersion has a higher value of Abbe number. In the upper part of Table 1, the materials are arranged according to their respective Abbe number in descending order while the lower part of Table 1, the materials are arranged according to their respective refractive index in descending order.

TABLE 1

| Material | Index (3.75 um) | Eff. Abbe (2.5-5.0 um) |
|---|---|---|
| CsI | 1.74 | 303 |
| CsBr | 1.67 | 290 |
| AgCl | 2.00 | 147 |
| Si | 3.43 | 139 |
| ZnSe | 2.43 | 123 |
| As2S3 | 2.41 | 119 |
| Amtir1 | 2.61 | 117 |
| GaAs | 3.31 | 84 |
| ClZnS | 2.25 | 83 |
| NaCl | 1.52 | 78 |
| Ge | 4.03 | 60 |
| BaF2 | 1.46 | 39 |
| NaF | 1.31 | 20 |
| CaF2 | 1.41 | 19 |
| MgF2 | 1.36 | 11 |

TABLE 1-continued

| Material | Index (3.75 um) | Eff. Abbe (2.5-5.0 um) |
|---|---|---|
| SrTi | 2.20 | 9 |
| Spinel | 1.65 | 8 |
| Sapphire | 1.69 | 7 |
| Ge | 4.03 | 60 |
| Si | 3.43 | 139 |
| GaAs | 3.31 | 84 |
| Amtir1 | 2.51 | 117 |
| ZnSe | 2.43 | 123 |
| As2S3 | 2.41 | 119 |
| ClZnS | 2.25 | 83 |
| SrTi | 2.20 | 9 |
| AgCl | 2.00 | 147 |
| CsI | 1.74 | 303 |
| Sapphire | 1.69 | 7 |
| CsBr | 1.67 | 290 |
| Spinel | 1.65 | 8 |
| NaCl | 1.52 | 78 |
| BaF2 | 1.46 | 39 |
| CaF2 | 1.41 | 19 |
| MAgF2 | 1.36 | 11 |
| NaF | 1.31 | 20 |

As can be seen in Table 1, silver chloride (AgCl) has an index of approximately 2.0 at a wavelength centered around 3.7 μm corresponding to the desired index to achieve enhanced FOV, i.e., a FOV greater than approximately 10 degrees (e.g., greater than approximately 15 degrees), while reducing or minimizing optical aberrations such as off-axis coma and astigmatism. In addition, silver chloride has a relatively higher effective Abbe number at the wavelength range of interest (e.g., between about 2.5 μm and about 5.0 μm). A material having a relatively higher effective Abbe number has lower optical dispersion. As a result, silver chloride can be selected as a material for making the field lens 28 (e.g., making the lens 28A and lens 28B).

As shown in Table 1, SrTi has a refractive index of approximately 2.2 at a wavelength centered around 3.7 μm which indicates that this material may be a candidate for making the field lens 28. However, as also shown in Table 1, SrTi has an effective Abbe number of about 9 which is relatively low indicating that this material has a relatively high optical dispersion. As a result, although SrTi has nearly the desired refractive index, this material does not provide an adequate low optical dispersion which may not be ideal for fabricating the field lens 28.

In an alternative embodiment, instead of selecting a single material from the above Table 1, it is also contemplated to combine two or more materials to obtain a composite lens assembly having the desired optical properties, i.e., a composite lens assembly material having an index of approximately 2 while achieving a relatively high Abbe number. For example, in one embodiment, CsI which has a refractive index of about 1.74 and an Abbe number of about 303 for a first field lens can be combined with a second field lens of ClZnS which has a refractive index of about 2.25 and an Abbe number of about 83. The obtained composite field lens assembly (CsI and ClZnS) may in theory provide an average refractive index of approximately 2 and an average effective Abbe number of about 193. With a refractive index of about 2 and a relatively high effective Abbe number of about 193, the obtained composite material satisfies the desired optical properties for a material for making the field lens 28.

A specific prescription for an embodiment of the optical system illustrated in FIGS. 2A and 2B is given in Table 2.

TABLE 2

| Surf No. | Description | Rd | Ad | Ae | Af | Ag | Thk | Mat'l |
|---|---|---|---|---|---|---|---|---|
| 1 | Corrector | inf | n/a | n/a | n/a | n/a | 0.50000 | ZnSe |
| 2 | | inf | 3.8897E−06 | −6.0639E−09 | 3.7741E−10 | −4.8902E−12 | 0.21000 | air |
| 3 | Stop | inf | n/a | n/a | n/a | n/a | 22.42172 | air |
| 4 | Primary | −37.0610 | n/a | n/a | n/a | n/a | −16.5508 | Refl |
| 5 | Lens 1 | −6.5542 | −5.9690E−04 | −5.7369E−05 | 3.1591E−06 | −4.2427E−07 | −0.79453 | AgCl |
| 6 | | −10.0687 | n/a | n/a | n/a | n/a | −0.65691 | air |
| 7 | Lens 2 | −9.3666 | 1.7457E−03 | −1.1108E−04 | 3.7349E−05 | −2.5495E−06 | −0.44652 | AgCl |
| 8 | | −19.6045 | n/a | n/a | n/a | n/a | −0.22713 | air |
| 9 | Filter | inf | n/a | n/a | n/a | n/a | −0.12500 | Ge |
| 10 | | inf | n/a | n/a | n/a | n/a | −0.09680 | air |
| 11 | Image | inf | n/a | n/a | n/a | n/a | n/a | n/a |

FOV is 11.8 × 11.8 deg (16.7 deg diagonal)
Stop diameter is 11.0
Focal length is 15.31
Speed is F/1.39

In Table 2 are listed the various optical surfaces of the telescope 20 and their respective radii of curvature (Rd), aspheric coefficients (Ad), (Ae), (Af), and (Ag), thickness (Thk), and type of material (Mat'l) when applicable. For example, surfaces 5 and 6 corresponds to first and second surface of lens 1 or lens 28A in field lens 28. Lens 28A is made from silver chloride (AgCl). Lens 28A has a first surface radius of approximately −6.6 inches and a second surface radius of about −10 inches. Lens 28A has an Ad of approximately −5.9 $10^{-4}$ inch, an Ae of approximately −5.7 $10^{-5}$ inch, an Af of approximately 3.1 $10^{-6}$ inch, an Ag of approximately −4.2 $10^{-7}$ inch, and a thickness of approximately −0.8 inch for the first surface.

With this optical prescription, telescope 20 achieves a square FOV of approximately 11.8 deg. by approximately 11.8 deg., i.e., approximately 16.7 deg. in diagonal (that is an FOV greater than approximately 15 degrees) and an F-number (speed) of approximately F/1.39. With this prescription, the focal length of telescope 20 is approximately 15.31 inches (approximately 39 cm). Additionally, it can be shown by accurate raytracing that aberrations of all types, both monochromatic and polychromatic, are suitably small, so as to render the optical design image quality diffraction limited in the SWIR and MWIR wavelength bands.

The prior art in the area of flat field Schmidt telescopes does not exhibit the use of optimum refractive index materials nor does it provide the optical theory for determining such optimum refractive index materials to achieve an extended field of view (FOV) greater than approximately 10 degrees. This is particularly so for operation in the IR spectrum (e.g., in SWIR and/or MWIR wavelength ranges).

It should be appreciated that in one embodiment, the drawings herein are drawn to scale (e.g., in correct proportion). However, it should also be appreciated that other proportions of parts may be employed in other embodiments.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. A flat field Schmidt-type telescope, comprising:
   a spherical primary mirror;
   an aspheric correcting plate spaced apart from the primary mirror;
   a detector disposed between the primary mirror and the aspheric correcting plate; and
   a field lens disposed between the primary mirror and the detector, the field lens being configured to reshape a curved field plane formed by the primary mirror into a flat field plane;
   wherein a material of the field lens is selected to transmit in the infrared wavelength range and is selected to have a desired refractive index so as to achieve a field of view (FOV) of the telescope greater than approximately 10 degrees.

2. The telescope of claim 1, wherein the telescope further comprises a spectral filter disposed between the field lens and the detector for selecting a desired range of wavelengths.

3. The telescope of claim 1, wherein the field lens comprises a plurality of lenses.

4. The telescope of claim 1, wherein the infrared wavelength range is between about 1.4 μm and about 8 μm.

5. The telescope of claim 4, wherein the infrared wavelength range is between 2.5 μm and about 5 μm.

6. The telescope of claim 1, wherein a focal length of the primary mirror is selected to be equal to approximately 18.5 inches and a focal length of the primary mirror in combination with the field lens is selected to be approximately 15.4 inches so as to obtain a desired range of refractive index of the material of the field lens.

7. The telescope of claim 6, wherein based on the range of desired refractive index, a distance between the primary mirror and the field lens is determined to be between approximately 16 inches and approximately 17.3 inches.

8. The telescope of claim 1, wherein the material of the field lens is selected to have a refractive index between approximately 1.4 and approximately 4 so as to obtain a field of view (FOV) of the telescope greater than approximately 10 degrees.

9. The telescope of claim 1, wherein the material of the field lens is selected to have a refractive index of approximately 2 so as to obtain a field of view (FOV) of the telescope greater than approximately 10 degrees.

10. The telescope of claim 1, wherein the field lens material is selected from the group consisting of Ge, Si, GaAs, Amtirl, ZnSe, As$_2$S$_3$, ClZnS, SrTi, AgCl, CsI, Sapphire, CsBr, Spinel, NaCl, BaF$_2$, CaF$_2$, MgF$_2$, and NaF.

11. The telescope of claim 10, wherein the field lens material comprises silver chloride (AgCl).

12. The telescope of claim 1, wherein the field lens material is a composite material comprising two or more of Ge, Si, GaAs, Amtirl, ZnSe, As$_2$S$_3$, ClZnS, SrTi, AgCl, CsI, Sapphire, CsBr, Spinel, NaCl, BaF$_2$, CaF$_2$, MgF$_2$, and NaF.

13. The telescope of claim 1, wherein the field lens material comprises CsI and ClZnS.

14. The telescope of claim 1, wherein the field of view (FOV) of the telescope is greater than approximately 15 degrees.

15. The telescope of claim 14, wherein the field of view (FOV) of the telescope is approximately 16.7 degrees.

16. The telescope of claim 1, wherein an F-number of the telescope is approximately F/1.39.

* * * * *